United States Patent
Rammohan et al.

(10) Patent No.: US 9,818,066 B1
(45) Date of Patent: Nov. 14, 2017

(54) AUTOMATED DEVELOPMENT AND UTILIZATION OF MACHINE-LEARNING GENERATED CLASSIFIERS

(71) Applicant: Amazon Technologies, Inc., Seattle, WA (US)

(72) Inventors: Roshan Ram Rammohan, Seattle, WA (US); Jeremy Leon Calvert, Seattle, WA (US); Deept Kumar, Seattle, WA (US); Ismail Baha Tutar, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 319 days.

(21) Appl. No.: 14/624,326

(22) Filed: Feb. 17, 2015

(51) Int. Cl.
  *G06F 15/18* (2006.01)
  *G06N 99/00* (2010.01)
  *G06F 17/30* (2006.01)

(52) U.S. Cl.
  CPC ..... *G06N 99/005* (2013.01); *G06F 17/30011* (2013.01)

(58) Field of Classification Search
  USPC .......................................................... 706/12
  See application file for complete search history.

(56) References Cited

U.S. PATENT DOCUMENTS

| | | | | |
|---|---|---|---|---|
| 7,089,241 B1 * | 8/2006 | Alspector | ............ | G06Q 10/107 |
| 7,725,475 B1 * | 5/2010 | Alspector | ............ | H04L 12/585 707/758 |
| 7,725,544 B2 * | 5/2010 | Alspector | ............ | G06Q 10/107 709/206 |
| 8,504,627 B2 * | 8/2013 | Alspector | ............ | G06Q 10/107 707/737 |
| 8,527,475 B1 * | 9/2013 | Rammohan | ....... | G06F 17/30489 707/692 |

(Continued)

OTHER PUBLICATIONS

Detecting Sentiment in Nepali texts: A bootstrap approach for Sentiment Analysis of texts in the Nepali language Chandan Prasad Gupta; Bal Krishna Bal 2015 International Conference on Cognitive Computing and Information Processing(CCIP) Year: 2015 pp. 1-4, DOI: 10.1109/CCIP.2015.7100739 IEEE Conference Publications.*

(Continued)

*Primary Examiner* — Michael B Holmes
(74) *Attorney, Agent, or Firm* — Lee & Hayes, PLLC

(57) ABSTRACT

Technologies are disclosed herein for generating and utilizing machine-learning generated classifiers configured to identify document relationships. Manually-generated data is captured that indicates if documents in a document corpus have a relationship with one another, such as duplicates or variations. A determination may then be made as to whether a classifier is to be generated based on the duplicate decision data. If a classifier is to be generated, machine learning may be performed using training documents from the document corpus and the duplicate decision data to generate a classifier. The machine-learning generated classifier may then be utilized in a production environment to determine whether a new document is a duplicate of documents in the document corpus and/or to identify other relationships between documents in the document corpus, such as documents that are similar or are variations of one another.

20 Claims, 9 Drawing Sheets

(56) References Cited

U.S. PATENT DOCUMENTS

| | | | |
|---|---|---|---|
| 8,577,814 B1 | 11/2013 | Wu et al. | |
| 8,713,014 B1* | 4/2014 | Alspector | H04L 12/585 |
| | | | 707/736 |
| 9,171,070 B2* | 10/2015 | Alspector | H04L 12/585 |
| 2013/0173518 A1* | 7/2013 | Alspector | H04L 12/585 |
| | | | 706/46 |
| 2013/0173562 A1* | 7/2013 | Alspector | H04L 12/585 |
| | | | 707/692 |

OTHER PUBLICATIONS

Enhanced discriminative models with tree kernels and unsupervised training for entity detection Lina M. Rojas-Barahona; Christophe Cerisara 2015 6th International Conference on Information Systems and Economic Intelligence (SIIE) Year: 2015 pp. 38-45, DOI: 10.1109/ISEI.2015.7358722 IEEE Conference Publications.*

Word Ordering and Document Adjacency for Large Loop Closure Detection in 2-D Laser Maps Jeremie Deray; Joan Solà; Juan Andrade-Cetto IEEE Robotics and Automation Letters Year: 2017, vol. 2, Issue: 3 pp. 1532-1539, DOI: 10.1109/LRA.2017.2657796 IEEE Journals & Magazines.*

An Eccentric Approach for Paraphrase Detection Using Semantic Matching and Support Vector Machine P. Vigneshvaran; E. Jayabalan; A. Vijaya Kathiravan 2014 International Conference on Intelligent Computing Applications Year: 2014 pp. 431-434, DOI: 10.1109/ICICA.2014.94 IEEE Conference Publications.*

* cited by examiner

AUTOMATED DEVELOPMENT AND UTILIZATION OF MACHINE-LEARNING GENERATED CLASSIFIERS

BACKGROUND

There are many different scenarios where it is desirable to identify documents in a document corpus that are variations or duplicates of another document. As one specific example, an electronic commerce ("e-commerce") merchant might maintain a document corpus containing a large number of documents that store data describing products available from the merchant (e.g. product records). In this scenario, it may be desirable to identify duplicate documents in the document corpus in order to avoid confusing customers by presenting different records for the same product. Duplicate documents or documents that are variations of one another that are identified in the document corpus may be merged in order to eliminate any duplication or variation.

As another example, when an e-commerce merchant receives a document identifying a new product from a vendor for inclusion in the document corpus, it may be desirable to determine whether a document already exists in the document corpus that corresponds to the new product (i.e. is a duplicate of the document submitted by the vendor). If a duplicate document already exists in the corpus, a new document will not be created in the corpus for the product. If, however, a duplicate document does not already exist in the corpus, the document for the new product may be added to the corpus.

Existing mechanisms for detection of duplicate documents and document variants frequently require significant human involvement in the duplicate or variation detection process. This limitation may cause existing mechanisms for duplicate detection to be slower and more expensive than desirable. The disclosure made herein is presented with respect to these and other considerations.

DETAILED DESCRIPTION

Figure 1:
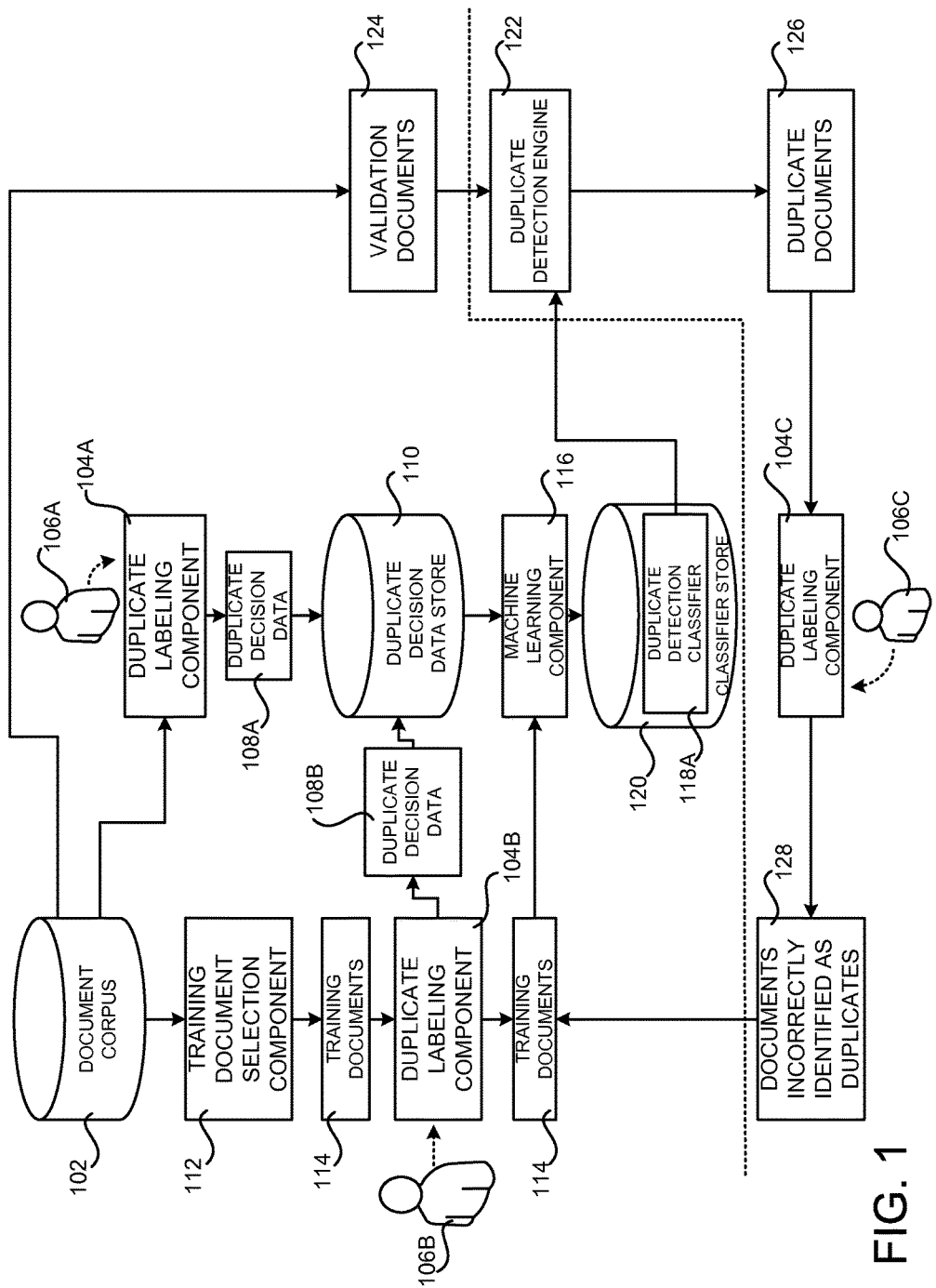
FIG. 1 is a system architecture diagram showing aspects of the configuration and operation of several components described herein for generating and utilizing machine-learning generated classifiers for duplicate document detection.

The following detailed description is directed to technologies for automated development and utilization of machine-learning generated classifiers. Utilizing an implementation of the technologies described herein, classifiers (which might also be referred to as "models" or "rules") for detecting relationships between documents, such as duplicate documents or documents that are variants of one another, can be generated in a manner that requires less human involvement than required by previous mechanisms. As a consequence, the classifiers may be deployed into production environments for use in detecting duplicate documents, documents that are variants of one another, or other document relationships more quickly and at a lower cost than classifiers generated using existing mechanisms.

According to one configuration presented herein, a mechanism is provided for automated generation and implementation of machine-learning generated duplicate detection classifiers. In order to enable this functionality, a component is provided through which human users can indicate whether documents in a document corpus are duplicates of one another or not. The human-generated duplicate decision data may then be utilized in order to determine whether a duplicate detection classifier is to be generated. A duplicate detection classifier is a classifier that can be utilized to determine whether two documents are duplicates of one another. As will be described in greater detail below, machine learning techniques may be utilized to generate the classifiers utilizing training documents from the document corpus and the human-generated duplicate decision data.

As mentioned briefly above, the duplicate decision data may be utilized to automatically determine whether a duplicate detection classifier is to be generated. For example, and without limitation, a duplicate detection classifier can be automatically generated when a specified quantity (e.g. four thousand decisions) of duplicate decision data has been captured. In some configurations, the duplicate decision data can also be utilized to identify a portion of the document corpus for which a duplicate detection classifier is to be generated. For example, and without limitation, a duplicate detection classifier might be generated that is configured to detect documents in a certain portion of the document corpus in response to determining that a specified number of documents in the portion have been manually identified as duplicates of one another. The duplicate decision data might also be utilized in other ways to determine if a duplicate detection classifier is to be automatically generated and/or to identify the portion of the documents in the document corpus for which the classifier is to be generated.

In some configurations, the documents in the document corpus might also, or alternately, be utilized to identify the portion of the documents in the document corpus for which a duplicate detection classifier is to be generated. For example, and without limitation, in one configuration random samples of the documents in the document corpus are taken and the duplication rate of the documents in the random samples are determined. The determination as to whether a duplicate detection classifier is to be generated may then be made based on the duplication rate of documents in the random samples. For instance, if documents in a certain portion of the document corpus have a higher than average duplication rate, then a process for generating a duplicate detection classifier may be initiated for the documents in that portion of the document corpus.

In another example, an audit of the documents in the document corpus might be performed in order to estimate the duplication rate in various portions of the document corpus. The portion of the document corpus for which a duplicate detection classifier is to be generated may then be identified based upon the results of the audit. For instance, if the audit indicates a higher duplication rate in a certain portion of the document corpus, then the process for generating a duplicate detection classifier may be initiated for the documents in that portion of the document corpus. The generated duplicate detection classifier has a higher precision for identifying duplicate documents in the document corpus than the audit. In this way, a lower precision mechanism can be utilized to identify the portions of a document corpus for which duplicate detection classifiers are to be automatically generated. As will be described in greater detail below, the duplicate detection classifiers may then be utilized to identify and, potentially, eliminate the duplicates in those portions of the document corpus. Other mechanisms might also be utilized to identify the portions of the document corpus for which duplicate detection classifiers are to be generated.

As described briefly above, once a determination has been made to generate a duplicate detection classifier and the portion of the document corpus for which the classifier is to be generated has been identified, machine learning may be utilized to generate the duplicate detection classifier. In particular, a set of training documents may be obtained from the document corpus for use in generating a duplicate detection classifier for a portion of the document corpus. Duplicate decision data for the training documents may then be captured by having a human identify duplicate and non-duplicate documents in the training data. A machine leaning component may then utilize the training documents and the captured duplicate decision data to generate a duplicate detection classifier. As discussed above, the duplicate detection classifier is a classifier that is configured to determine whether two documents are duplicates of one another.

In order to validate the precision of the generated duplicate detection classifier, a duplicate detection engine may utilize the duplicate detection classifier to identify the duplicates, if any, in a set of validation documents obtained from the document corpus. The validation documents are documents from the document corpus that are different than the training documents. If the precision of the duplicate detection classifier is greater than or equal to a desired precision (e.g. 100%), then the duplicate detection classifier can be placed into production to identify duplicates. Details regarding the use of the duplicate detection classifier to identify duplicate documents in a production environment are provided below.

If the precision of the duplicate detection classifier is below the desired precision, any documents in the set of validation documents that were incorrectly identified as duplicates are added to the training documents along with duplicate decision data for the documents. The machine learning component then retrains the duplicate detection classifier on the updated set of training documents in an attempt to improve the precision of the classifier. This process is then repeated until the precision of the duplicate detection classifier is greater than or equal to the desired precision. The duplicate detection classifier may then be placed into use detecting duplicate documents.

In a production environment, a duplicate detection engine may utilize the duplicate detection classifiers in order to periodically identify duplicate documents in the document corpus. Duplicate documents identified in the document corpus might then be merged in order to eliminate the duplication. In a similar manner, the duplicate detection classifiers might be utilized to determine if a new document intended for inclusion in the document corpus is a duplicate of any of the documents currently existing in the document corpus. If the new document is not a duplicate of any document currently existing in the document corpus, then the new document is added to the document corpus. The new document will not, however, be added to the document corpus if it is a duplicate of any other document in the document corpus.

It should be appreciated that while the technologies disclosed herein are primarily presented in the context of identification of duplicate documents, the technologies disclosed herein might similarly be utilized in other contexts. For example, and without limitation, the technologies disclosed herein might be utilized to generate classifiers for identifying other types of relationships between documents. For example, and without limitation, the technologies disclosed herein can be utilized to generate classifiers to identify documents that are similar to one another, to identify documents that include links to one another, to identify documents that are variations of one another, to determine if a document has been assigned to the proper category, and/or for other purposes. Additional details regarding the various components and processes described briefly above for the automated development and utilization of machine-learning generated duplicate detection classifiers will be presented below with regard to FIGS. 1-9.

It should be appreciated that the subject matter presented herein may be implemented as a computer process, a computer-controlled apparatus, a computing system, or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that aspects of the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, mobile telephone devices, tablet computing devices, special-purposed hardware devices, network appliances, and the like. As mentioned briefly above, the configurations described herein may be practiced in distributed computing environments, where tasks may be performed by remote computing devices that are linked through a communications network. In a distributed computing environment, program modules may be located in both local and remote memory storage devices.

In the following detailed description, references are made to the accompanying drawings that form a part hereof, and that show, by way of illustration, specific configurations or examples. The drawings herein are not drawn to scale. Like numerals represent like elements throughout the several figures (which may be referred to herein as a "FIG." or "FIGS.").

FIG. 1 is a system architecture diagram showing aspects of the configuration and operation of several components described herein for development and utilization of machine-learning generated duplicate detection classifiers. As shown in FIG. 1, a document corpus 102 may be created and maintained. The document corpus 102 contains documents and may be stored by a computer as a data store, database, or in another manner.

In one particular implementation, the documents in the document corpus 102 are product records corresponding to products available from an e-commerce merchant (not shown in FIG. 1). In this implementation, the documents include semi-structured data corresponding to various attributes of the products. For example, the documents might include a "name" attribute storing data that defines a name of a product. The documents might similarly include a "description" attribute storing a textual description of a product. The documents might also include other attributes (which might also be referred to herein as "fields") containing other types of data describing various aspects of a product. Although the various configurations described herein are presented primarily in the context of a document corpus 102 storing documents containing semi-structured product data, it should be appreciated that the technologies disclosed herein can be utilized with documents other than product records.

As will be described in greater detail below, the technologies disclosed herein can be utilized to generate duplicate detection classifiers, such as the duplicate detection classifier 118A, for use in determining whether two documents are duplicates of one another. For example, and without limitation, the technologies disclosed herein might be utilized to identify duplicate product records within the document corpus 102 and to eliminate the duplicates. The technologies disclosed herein might also be utilized to determine if a document not contained in the document corpus 102 (e.g. a document to be added to the document corpus 102) is a duplicate of any other documents in the document corpus 102.

It should be appreciated that other applications of the technologies disclosed herein might also be made. For example, and as discussed briefly above, the technologies disclosed herein can be utilized to generate classifiers 118 for identifying many kinds of relationships between documents. For example, and without limitation, the relationships between the documents may include documents that are duplicates of one another, documents that are similar to one another, documents that include links to one another, or documents that are variations of one another. In this regard, it should be appreciated that two documents are variations of one another when the documents have some amount of common content.

As also shown in FIG. 1 and described briefly above, a duplicate labeling component 104A is utilized in some configurations. The duplicate labeling component 104A is a software component that provides functionality for enabling human users, such as the user 106A, to label pairs of documents in the document corpus 102 as being duplicates of one another or as not being duplicates of one another. For example, the duplicate labeling component 104A might present a graphical user interface ("GUI") in which two documents from the document corpus 102 are presented. The user 106A can then make a decision as to whether the two documents are duplicates of one another. The duplicate labeling component 104A generates data, referred to herein as duplicate decision data 108A, that reflects the decision of the user 106A as to whether the two documents are duplicates of one another. The duplicate labeling component 104A may then store the duplicate decision data 108A in the duplicate decision data store 110. The duplicate decision data store 110 might be a conventional database, a network database, and/or another type of storage component or system. In other configurations the duplicate labeling component 104A might allow a user to specify other relationships between documents, such as similar documents, documents with links to one another, and/or documents that are variations of one another.

In some configurations, the duplicate labeling component 104A is also configured to make a copy, or "snapshot", of the documents that have been identified as duplicates or as having other relationships. The snapshots of the documents that have been identified as duplicates might also be stored in the duplicate decision data store 110 with the duplicate decision data 108A. As will be described in greater detail below, the duplicate decision data 108A and the snapshots can be utilized by a machine learning component 116 for machine learning classifiers, referred to herein as duplicate detection classifiers 118, that can be utilized to detect other duplicate documents in the document corpus 102 in an automated fashion. Additional details regarding this process are provided below.

In order to generate a duplicate detection classifier 118, a training document selection component 112 is utilized in some configurations to select a set of training documents 114 from the documents contained in the document corpus 102. In some configurations, the training document selection component 112 provides functionality for allowing a human user, such as the user 106B, to manually select the documents from the document corpus for use as the training documents 114. For example, and without limitation, the training document selection component 112 might provide a GUI through which a user can select the dimensions upon which a new duplicate detection classifier 118 is to be generated.

In other configurations, the training document selection component 112 is configured to automatically select the training documents 114 that will be utilized to generate a new duplicate detection classifier 118. For example, and without limitation, the training document selection component 112 might initiate an audit of the documents in the document corpus 102 in order to estimate the duplication rate in various portions of the document corpus 102. The portion of the document corpus 102 for which a duplicate detection classifier 118 is to be generated may then be identified based upon the results of the audit. For instance, if the audit indicates a higher duplication rate in a certain portion of the document corpus 102, then the process described below for generating a duplicate detection classifier 118 may be initiated for the documents in that portion of the document corpus 102. The generated duplicate detection classifier 118 has a higher precision for identifying duplicate documents in the document corpus 102 than the audit. In this way, a lower precision mechanism can be utilized to identify the portions of the document corpus 102 for which duplicate detection classifiers 118 are to be automatically generated.

In another configuration, the training document selection component 112 is configured to take random samples of the documents in the document corpus 102 in order to select the training documents 114. In this configuration, random samples of the documents in the document corpus 102 are taken and the duplication rate of the documents in the random samples are determined. The determination as to whether a duplicate detection classifier 118 is to be generated may then be made based on the duplication rate of documents in the random samples. For instance, if documents in a certain portion of the document corpus 102 have a higher than average duplication rate, then the process for generating a duplicate detection classifier 118 described below may be initiated for the documents in that portion of the document corpus 102. The training document selection component 112 might also utilize other mechanisms to identify a portion of the documents contained in the document corpus 102 for use as the training documents 114.

Once the set of training documents 114 has been obtained from the document corpus 102 for use in generating a duplicate detection classifier 118 for a portion of the document corpus 102, the duplicate labeling component 104B may be utilized to manually identify duplicate documents, and non-duplicate documents, in the training documents 114. For example, and without limitation, the duplicate labeling component 104B may provide functionality for enabling human users, such as the user 106B, to label pairs of documents in the set of training documents 114, as being duplicates of one another or as not being duplicates of one another. For example, the duplicate labeling component 104B might present a GUI in which two documents from the set of training documents 114 are presented. The user 106B can then make a decision as to whether the two documents are duplicates of one another. The duplicate labeling component 104B then generates duplicate decision data 108B that reflects the decision of the user 106B as to whether the two documents are duplicates of one another. The duplicate labeling component 104B may then store the duplicate decision data 108B in the duplicate decision data store 110. The duplicate labeling component 104B might also store snapshots of the training documents 114 identified as being duplicates of one another.

As shown in FIG. 1, a machine leaning component 116 may utilize the captured duplicate decision data 108 to generate a duplicate detection classifier 118. As discussed above, a duplicate detection classifier 118 is a classifier that is configured to determine whether two documents are duplicates of one another. The duplicate detection classifiers 118 might be stored in a classifier store 120. The classifier store 120 can be implemented as a conventional database, a database service, in a storage service, or in another manner.

As shown in FIG. 1, a duplicate detection engine 122 can utilize the duplicate detection classifiers 118 to detect duplicate documents or other document relationships. For example, and as described in greater detail below, one or more duplicate detection classifiers 118 may be utilized to identify duplicate documents contained in the document corpus 102. Any duplicate documents may then be merged to eliminate the duplicity. As another example, a request may be received to add a new document to the document corpus 102. In this example, one or more duplicate detection classifiers 118 may be utilized to determine if the new document is a duplicate of any documents in the document corpus 102. If the new document is a duplicate of any documents in the document corpus 118, the new document will not be added to the document corpus 102. Additional details regarding this process are provided below with regard to FIGS. 4 and 5.

Before using the duplicate detection classifier 118 to detect duplicate documents in a production environment, a validation process is performed on the duplicate detection classifier 118 in some configurations. In particular, in order to validate the precision of the generated duplicate detection classifier 118, the duplicate detection engine 122 may utilize the duplicate detection classifier 118 to identify the duplicate documents 126, if any, in a set of validation documents 124 obtained from the document corpus 102. The validation documents 124 are documents from the document corpus 120 that are different than the training documents 114 (i.e. the machine learning component did not utilize the validation documents 124 in the creation of the duplicate detection classifier 118).

A human user, such as the user 106C, may then utilize the duplicate labeling component 104C to determine the precision of the duplicate detection classifier 118 in identifying duplicate documents in the validation documents 124. If the precision of the duplicate detection classifier 118 is determined to be greater than or equal to a desired precision (e.g. 100%), then the duplicate detection classifier 118 can be placed into production to identify duplicate documents in the manner described below with regard to FIGS. 4 and 5.

If the precision of the duplicate detection classifier 118 is determined to be below the desired precision, any documents in the set of validation documents that were incorrectly identified as duplicates (shown in FIG. 1 as documents incorrectly identified as duplicates 128) are added to the set of training documents 114 along with duplicate decision data for the documents 128. The machine learning component 116 then retrains the duplicate detection classifier 118 on the updated set of training documents 114 in an attempt to improve the precision of the duplicate detection classifier 118. This process is then repeated until the precision of the duplicate detection classifier 118 is greater than or equal to the desired precision. The duplicate detection classifier 118 may then be placed into use detecting duplicate documents in the manner described below with regard to FIGS. 4 and 5. Additional details regarding the mechanism described above for generation and validation of machine-learning generated duplicate detection classifiers 118 will be provided below with regard to FIGS. 2 and 3.

Figure 2:
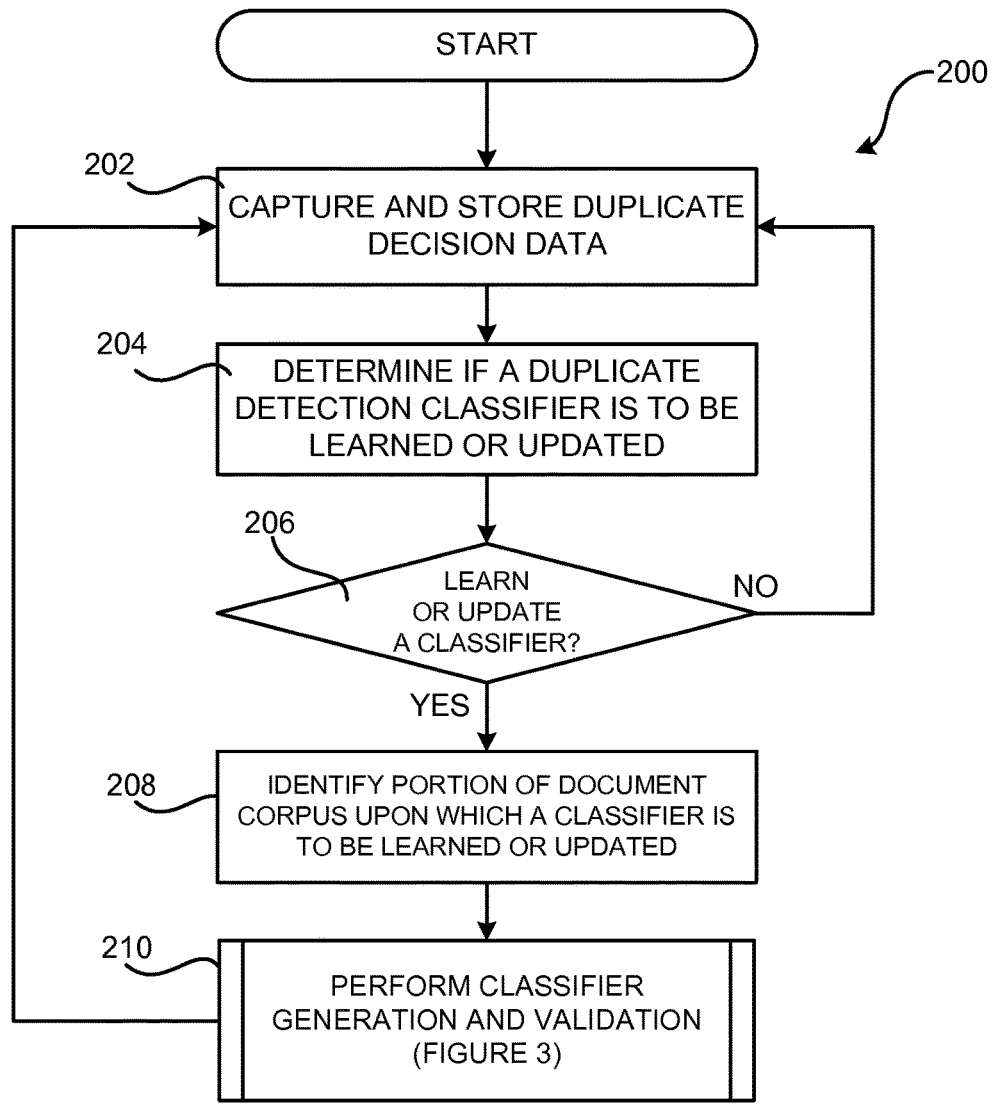
FIG. 2 is a flow diagram illustrating aspects of a routine disclosed herein for automated generation and utilization of machine-learning generated classifiers for duplicate document detection.

FIG. 2 is a flow diagram illustrating aspects of a routine 200 disclosed herein for automated generation and utilization of machine-learning generated classifiers 118 for duplicate document detection. It should be appreciated that the logical operations described herein with respect to FIG. 2, and the other FIGS., may be implemented (1) as a sequence of computer implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the FIGS. and described herein. These operations may also be performed in parallel, or in a different order than those described herein. Some or all of these operations might also be performed by components other than those specifically identified.

The routine 200 begins at operation 202, where the duplicate decision data 108 is captured and stored in the duplicate decision data store 110. As discussed above, the duplicate decision data 108 describes manually-made decisions regarding whether two documents are duplicates of one another that are made by human operators, such as the users 106A-106C. As also described above, the duplicate decision data 108 might be captured independently of the classifier 118 generation process described above or might be captured as a part of the classifier 118 generation process. For example, the duplicate decision data 108B might be captured during the generation of the training documents 114. Duplicate decision data might also be captured during the verification of the classifiers 118.

From operation 202, the routine 200 proceeds to operation 204, where a determination is made as to whether a duplicate detection classifier 118 is to be learned or updated. In one configuration, for example, the machine learning component 116 determines whether a user-specified quantity of duplicate decision data 108 has been generated. For instance, and without limitation, the process of generating a duplicate detection classifier 118 might be automatically started when duplicate decision data 108 has been received for 4000 pairs of documents in a particular category of documents in the document corpus 102. As another example, the machine learning component 116 might determine that a large number of documents having a particular attribute (e.g. product brand) are being identified as duplicates through the duplicate labeling component 104A. In response to such a determination, the process for generating a duplicate detection classifier 118 for documents having that attribute may be initiated. Other indications might also be utilized by the machine learning component 116 and/or another component in order to automatically initiate the process of generating a new duplicate detection classifier 118.

Other conditions might also cause the machine learning component 116 or another component to initiate a process for updating (i.e. retraining) a duplicate detection classifier 118. For example, and as discussed above, the documents in the document corpus 102 might also, or alternately, be utilized to determine whether a duplicate detection classifier 118 is to be generated or updated. For example, and without limitation, in one configuration random samples of the documents in the document corpus 102 are taken and the duplication rate of the documents in the random samples are determined. The determination as to whether a duplicate detection classifier is to be generated may then be made based on the duplication rate of documents in the random samples. For instance, if documents in a certain portion of the document corpus 102 have a higher than average duplication rate, then the process described below for generating a duplicate detection classifier 118 may be initiated for the documents in that portion of the document corpus 102.

In another example, an audit of the documents in the document corpus 102 might be performed in order to estimate the duplication rate in various portions of the document corpus 102. The portion of the document corpus 102 for which a duplicate detection classifier 118 is to be generated may then be identified based upon the results of the audit. For instance, if the audit indicates a higher duplication rate in a certain portion of the document corpus, then the process for generating a duplicate detection classifier 118 described below may be initiated for the documents in that portion of the document corpus 102. Other mechanisms might also be utilized to determine if a duplicate detection classifier is to be learned or updated.

If, at operation 204, it is determined that a duplicate detection classifier 118 is not to be learned or updated, the routine 200 proceeds from operation 206 to operation 202, where operations 202 and 204 may be repeated. If, however, a determination is made to generate or update a duplicate detection classifier 118, the routine 200 proceeds from operation 206 to operation 208.

At operation 208, the portion of the document corpus 102 for which a duplicate detection classifier 118 is to be generated or updated is identified. As discussed above, various mechanisms may be utilized to determine the portion of the document corpus 102 for which a classifier 118 is to be generated or updated. For example, and without limitation, the duplicate decision data 108 might be utilized to identify the portion of the document corpus 102 for which a classifier 118 is to be generated or updated. As a specific example, the duplicate decision data 108 might indicate a significant number of duplicates in a particular category of documents. In this example, a new classifier 118 might be generated for identifying duplicates in that category of documents. An existing classifier might be updated if a classifier already exists for identifying duplicates in the category.

As another example, and as described above, random sampling of the documents in the document corpus 102 might also be utilized to identify the portion of the document corpus 102 for which a new classifier 118 is to be generated. Similarly, and as also described above, an audit of the documents in the document corpus 102 might also be performed to identify the portion of the documents in the document corpus 102 for which a new classifier 118 is to be generated. For instance, if the audit indicates a higher duplication rate in a certain portion of the document corpus 102, then the process described below for generating a duplicate detection classifier 118 may be initiated for the documents in that portion of the document corpus 102. As discussed above, the generated duplicate detection classifier 118 will have a higher precision for identifying duplicate documents in the document corpus 102 than the audit. In this way, a lower precision mechanism can be utilized to identify the portions of the document corpus 102 for which duplicate detection classifiers 118 are to be automatically generated. Other mechanisms might also be utilized to automatically identify the portion of the document corpus 102 for which a duplicate detection classifier 118 is to be generated or updated in other configurations.

Once the portion of the document corpus 102 for which a duplicate detection classifier 118 has been identified, the routine 200 proceeds from operation 208 to operation 210. At operation 210, the classifier development and validation process described briefly above with regard to FIG. 1 is performed. Additional details regarding this process are provided below with regard to FIG. 3. From operation 210, the routine 200 proceeds from operation 210 back to operation 202, where the process described above may be repeated in order to generate and/or update duplicate detection classifiers in an automated fashion.

Figure 3:
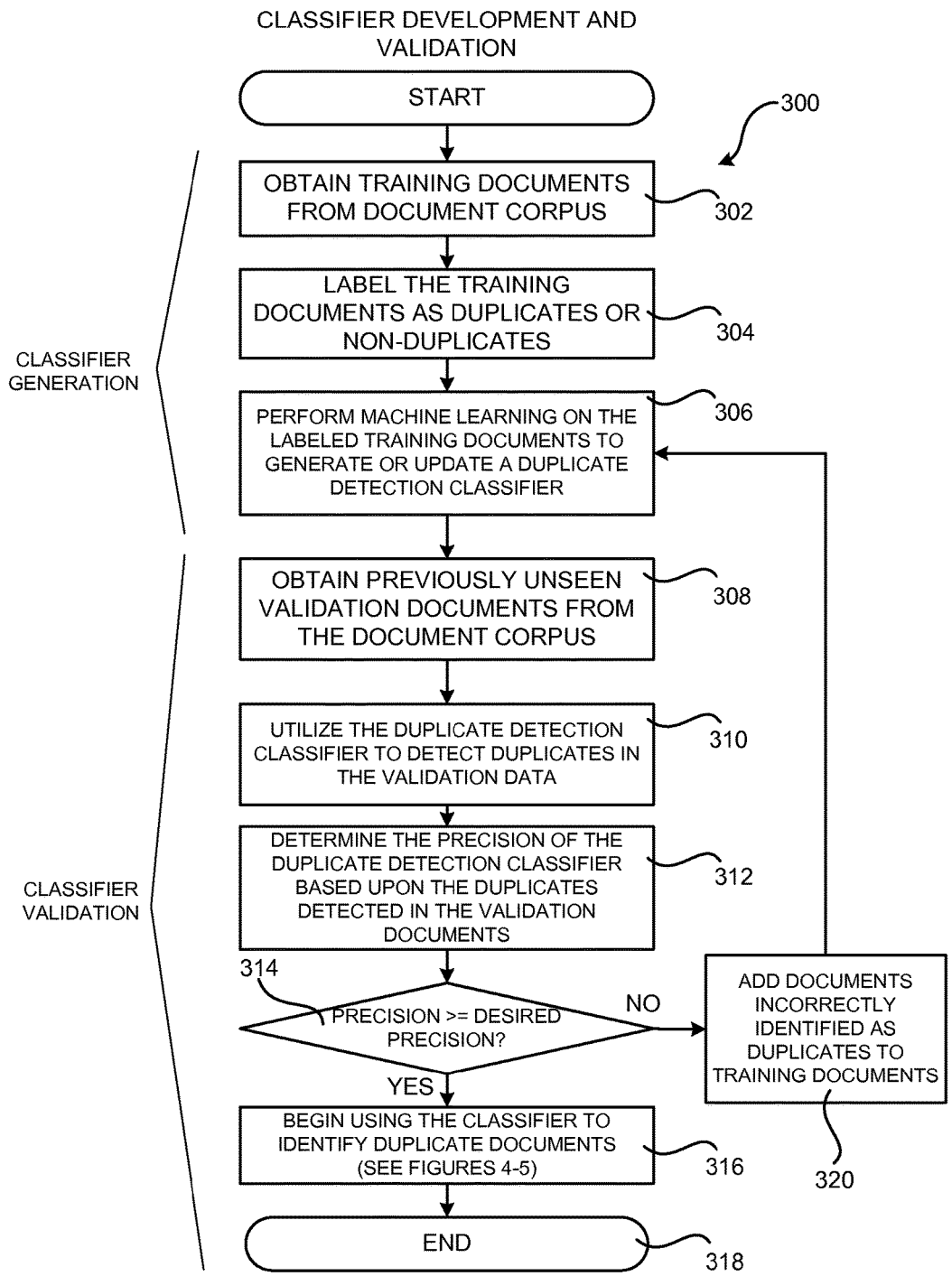
FIG. 3 is a flow diagram illustrating aspects of a routine disclosed herein for developing and validating duplicate detection classifiers.

FIG. 3 is a flow diagram illustrating aspects of a routine 300 disclosed herein for developing and validating duplicate detection classifiers 118. The routine 300 begins at operation 302, where the training document selection component 112 selects a set of training documents 114 from the documents contained in the document corpus 102. In some configurations, the training document selection component 112 provides functionality for allowing a human user, such as the user 106B, to manually select the documents from the document corpus for use as the training documents 114. For example, and as discussed briefly above, the training document selection component 112 might provide a GUI through which a user can select the dimensions upon which a new duplicate detection classifier 118 is to be generated. In other configurations, the training document selection component 112 is configured to automatically select the training documents 114 that will be utilized to generate the duplicate detection classifier 118. For example, documents may be automatically selected for generating a classifier 118 to detect documents in the portion of the document corpus identified at operation 208, described above. Other mechanisms might also be utilized.

Once the set of training documents 114 has been obtained from the document corpus 102 for use in generating a duplicate detection classifier 118 for a portion of the document corpus 102, the routine 300 proceeds to operation 304, where the duplicate labeling component 104B may be utilized to manually identify duplicate documents, and non-duplicate documents, in the training documents 114. For example, and without limitation, the duplicate labeling component 104B may provide functionality for enabling human users, such as the user 106B, to label pairs of documents in the set of training documents 114, as being duplicates of one another or as not being duplicates of one another.

As discussed above, the duplicate labeling component 104B might present a GUI in which two documents from the set of training documents 114 are presented. The user 106B can then make a decision as to whether the two documents are duplicates of one another. The duplicate labeling component 104B then generates duplicate decision data 108B that reflects the decision of the user 106B as to whether the two documents are duplicates of one another. The duplicate labeling component 104B may then store the duplicate decision data 108B in the duplicate decision data store 110. The duplicate labeling component 104B might also store snapshots of the training documents 114 identified as being duplicates of one another.

From operation 304, the routine 300 proceeds to operation 306, where the machine leaning component 116 utilizes the captured duplicate decision data 108 to generate a duplicate detection classifier 118. Before using the duplicate detection classifier 118 to detect duplicate documents in a production environment, a validation process is performed on the duplicate detection classifier 118 in some configurations. The validation process is represented by operations 308, 310, 312, 314 and 320, shown in FIG. 3.

The validation process begins at operation 308, where a set of validation documents 124 is obtained from the document corpus 102. The validation documents 124 are documents from the document corpus 120 that are different than the training documents 114 (i.e. the machine learning component did not utilize the validation documents 124 in the creation of the duplicate detection classifier 118).

The routine 300 then proceeds to operation 310, where a human user, such as the user 106C, may then utilize the duplicate labeling component 104C to determine the precision of the duplicate detection classifier 118 in identifying duplicate documents in the validation documents 124. For example, and without limitation, the user 106C might determine whether the duplicate documents 126 identified by the duplicate detection classifier 118 are actual duplicates of one another. From this determination, the precision of the duplicate detection classifier 118 may be determined at operation 312.

If the precision of the duplicate detection classifier 118 is determined to be greater than or equal to a desired precision (e.g. 100%), then the routine 300 continues from operation 314 to operation 316, where the duplicate detection classifier 118 is placed into production to identify duplicate documents in the manner described below with regard to FIGS. 4 and 5. The routine 300 then proceeds from operation 316 to operation 318, where it ends.

If, however, at operation 314 the precision of the duplicate detection classifier 118 is determined to be below the desired precision, any documents in the set of validation documents 124 that were incorrectly identified as duplicates (shown in FIG. 1 as documents incorrectly identified as duplicates 128) are added to the set of training documents 114 along with duplicate decision data for the documents 128 at operation 320. The routine 300 then proceeds back to operation 306, where the machine learning component 116 then retrains the duplicate detection classifier 118 on the updated set of training documents 114 in an attempt to improve the precision of the duplicate detection classifier 118. The operations 308, 310, 312 and 314 are then repeated until the precision of the duplicate detection classifier 118 is greater than or equal to the desired precision. The duplicate detection classifier 118 may then be placed into use detecting duplicate documents in the manner described below with regard to FIGS. 4 and 5.

Figure 4:
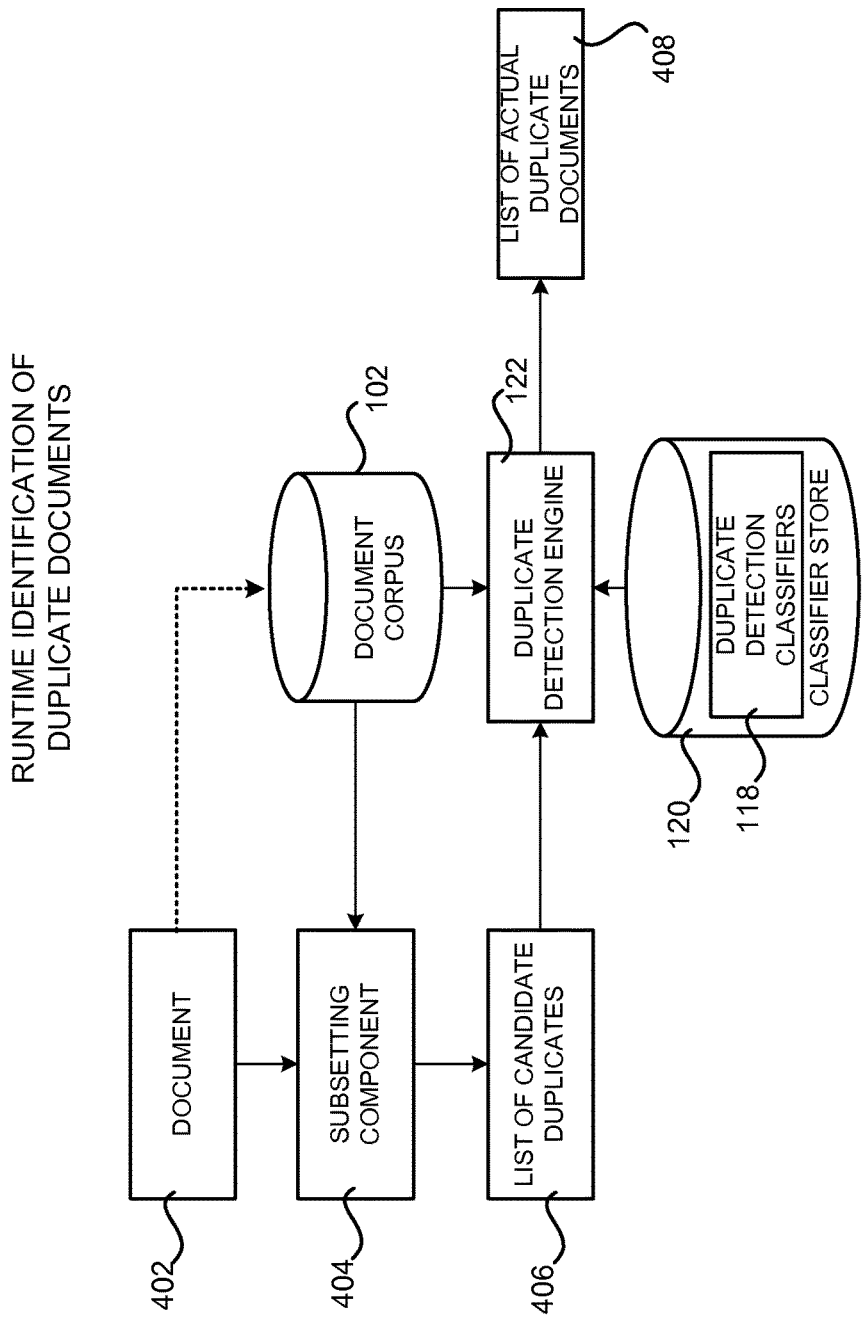
FIG. 4 is system architecture diagram showing aspects of the configuration and operation of several components described herein for runtime identification of duplicate documents utilizing machine-learning generated duplicate detection classifiers.

FIG. 4 is system architecture diagram showing aspects of the configuration and operation of several components described herein for runtime identification of duplicate documents utilizing machine-learning generated duplicate detection classifiers 118. As shown in FIG. 4, and described briefly above, a new document 402 might be received that is intended for inclusion in the document corpus 102. For example, a new product record for a particular product might be received for inclusion in the document corpus 102. In response to receiving the new document 402, a subsetting component 404 may be utilized to generate a list 406 of candidate duplicate documents. The list 406 of candidate duplicate documents identifies documents in the document corpus 102 that are likely to be duplicates of the new document 402. One mechanism for generating the list 406 of candidate duplicates is described in U.S. patent application Ser. No. 14/574,107, entitled "Optimized Mapping of Documents to Candidate Duplicate Documents in a Document Corpus", which was filed on Dec. 17, 2014, and which is expressly incorporated herein by reference in its entirety.

Once the list 406 of candidate duplicates has been generated, the duplicate detection engine 122 utilizes the duplicate detection classifiers 118 to generate a list 408 of duplicate documents. The list 408 identifies those documents in the document corpus 102 that are actual duplicates of the new document 402. If the new document 402 is not a duplicate of any document currently existing in the document corpus 102, then the new document 402 is added to the document corpus 102. The new document 402 will not, however, be added to the document corpus 102 if it is a duplicate of any other document in the document corpus 102.

It should be appreciated that the duplicate detection engine 122 might also periodically utilize the duplicate detection classifiers 118 to detect duplicate documents in all or a portion of the document corpus 102. Various triggers might cause such a process to be performed. For example, and without limitation, the updating or modification of a duplicate detection classifier 118 might cause the duplicate detection engine 122 to utilize the updated or modified classifier to detect duplicates in the appropriate portion of the document corpus 102. Other conditions and/or triggers might also cause the duplicate detection engine 122 to detect duplicates in all or a portion of the document corpus 102.

Figure 5:
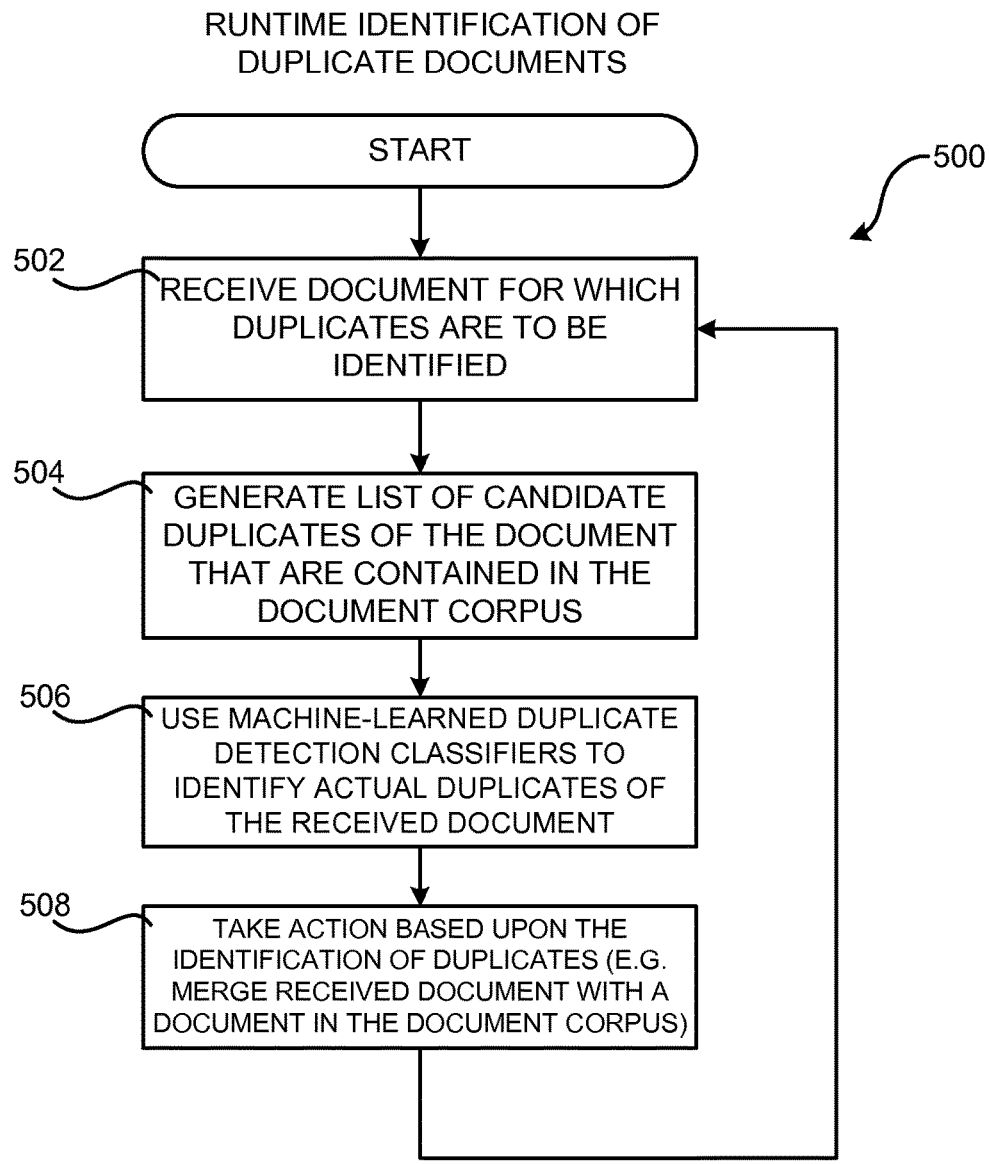
FIG. 5 is a flow diagram illustrating aspects of a routine disclosed herein for runtime identification of duplicate documents utilizing machine-learning generated duplicate detection classifiers.

FIG. 5 is a flow diagram illustrating aspects of routine 500 disclosed herein for runtime identification of duplicate documents utilizing machine-learning generated duplicate detection classifiers 118. The routine 500 begins at operation 502, where a new document 402 is received for which duplicates in the document corpus 102 are to be identified. The routine 500 then proceeds to operation 504, where the subsetting component 404 generates a list 406 of candidate duplicate documents for the new document 402 in the manner described above.

From operation 504, the routine 500 proceeds to operation 506, where the duplicate detection engine utilizes the machine-learned duplicate detection classifiers 118 to identify actual duplicates of the new document 402 in the document corpus 102. As mentioned above, this may include outputting a list 408 of actual duplicate documents if any are located. As also mentioned above, various types of actions might be taken based upon whether any duplicate documents are located. For example, and without limitation, a received document 402 might be merged with an existing document in the document corpus 102. Other types of actions might also be taken in other configurations. From operation 508, the routine 500 proceeds back to operation 502, where the process described above may be repeated. It should be appreciated that the processes shown in FIGS. 2-4 and discussed above can also be utilized to generate, validate, and utilize classifiers for use in detection variations between documents and/or for identifying other relationships between documents.

Figure 6:
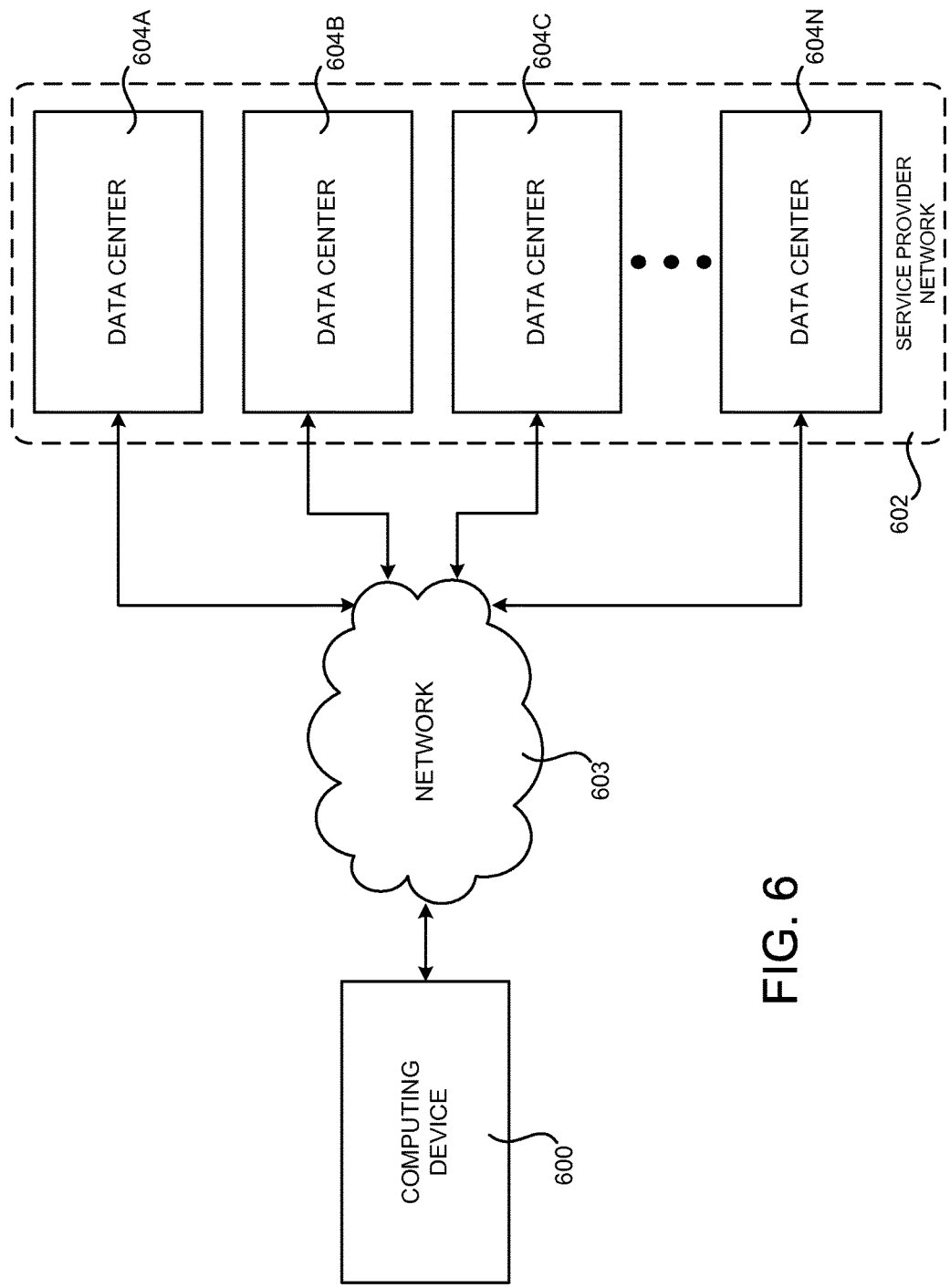
FIG. 6 is a system and network diagram that shows an illustrative operating environment that includes a service provider network that may be configured to implement aspects of the functionality described herein.

FIG. 6 is a system and network diagram that shows one illustrative operating environment for the configurations disclosed herein that includes a service provider network 602 that may be configured to develop and utilize machine-learning generated classifiers 118 in the manner described above, according to one configuration disclosed herein.

The service provider network 602 can provide computing resources on a permanent or an as-needed basis. Among other types of functionality, the computing resources provided by the service provider network 602 can be utilized to execute the various services described above. The computing resources provided by the service provider network 602 may include various types of computing resources, such as data processing resources, data storage resources, networking resources, data communication resources, and the like. Each type of computing resource may be general-purpose or may be available in a number of specific configurations. For example, data processing resources may be available as physical computers or virtual machine instances in a number of different configurations. The virtual machine instances may be configured to execute applications, including Web servers, application servers, media servers, database servers, some or all of the services described above, and other types of programs. Data storage resources may include file storage devices, block storage devices, and the like, and may be utilized to store data, such as the document corpus 102. The service provider network 602 might also be configured to provide other types of resources and network services.

The computing resources provided by the service provider network 602 are enabled in one implementation by one or more data centers 604A-604N (which may be referred to herein singularly as "a data center 604" or in the plural as "the data centers 604"). The data centers 604 are facilities utilized to house and operate computer systems and associated components. The data centers 604 typically include redundant and backup power, communications, cooling, and security systems. The data centers 604 might also be located in geographically disparate locations. One illustrative configuration for a data center 604 that implements some of the technologies disclosed herein for developing and utilizing machine-learning generated classifiers will be described below with regard to FIG. 7.

The customers and other users of the service provider network 602 may access the computing resources provided by the service provider network 602 over a network 603, such as a wide area network ("WAN") like the Internet. For example, and without limitation, a computing device 600 operated by a customer or other user of the service provider network 602 might be utilized to access the service provider network 602 by way of the network 603. It should be appreciated that a local-area network ("LAN"), the Internet, or any other networking topology known in the art that connects the data centers 604 to remote customers and other users may be utilized. It should also be appreciated that combinations of such networks might also be utilized.

Figure 7:
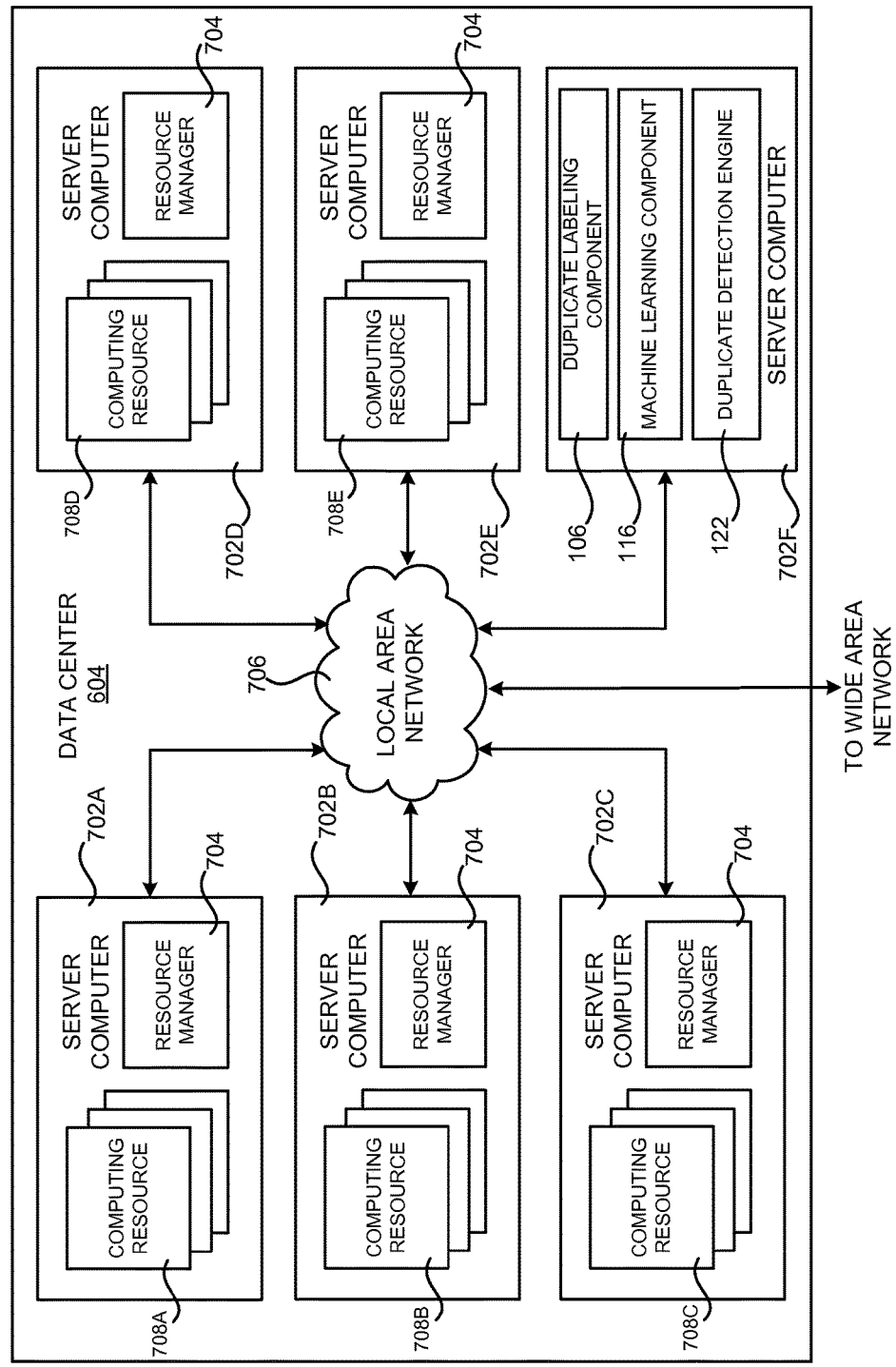
FIG. 7 is a computing system diagram that illustrates a configuration for a data center that may be utilized to implement aspects of the technologies disclosed herein.

FIG. 7 is a computing system diagram that illustrates one configuration for a data center 604 that implements aspects of the concepts and technologies disclosed herein for developing and utilizing machine-learning generated classifiers, according to one configuration disclosed herein. The example data center 604 shown in FIG. 7 includes several server computers 702A-702F (which may be referred to herein singularly as "a server computer 702" or in the plural as "the server computers 702") for providing computing resources 708A-708E.

The server computers 702 may be standard tower, rackmount, or blade server computers configured appropriately for providing the computing resources described herein. As mentioned above, the computing resources might be data processing resources such as virtual machine instances or hardware computing systems, data storage resources, database resources, networking resources, and others. Some of the servers 702 might also be configured to execute a resource manager 704 capable of instantiating and/or managing the computing resources. In the case of virtual machine instances, for example, the resource manager 704 might be a hypervisor or another type of program configured to enable the execution of multiple virtual machine instances on a single server 702. Server computers 702 in the data center 704 might also be configured to provide network services and other types of services, some of which are described in detail below with regard to FIG. 8.

The data center 604 shown in FIG. 7 also includes a server computer 702F that may execute some or all of the software components described above. For example, and without limitation, the server computer 702F might be configured to execute the duplicate labeling component 106, the machine learning component 116 and/or the duplicate detection engine 122, each of which has been described in detail above. The server computer 702F might also be configured to execute other components and/or to store data for providing some or all of the functionality described herein. In this regard, it should be appreciated that the services illustrated in FIG. 7 as executing on the server computer 702F might execute on many other physical or virtual servers in the data centers 604 in various configurations.

In the example data center 604 shown in FIG. 7, an appropriate LAN 706 is also utilized to interconnect the server computers 702A-702F. The LAN 706 is also connected to the network 603 illustrated in FIG. 6. It should be appreciated that the configuration and network topology described herein has been greatly simplified and that many more computing systems, software components, networks, and networking devices may be utilized to interconnect the various computing systems disclosed herein and to provide the functionality described above. Appropriate load balancing devices or other types of network infrastructure components might also be utilized for balancing a load between each of the data centers 604A-604N, between each of the server computers 702A-702F in each data center 604, and, potentially, between computing resources in each of the data centers 604. It should be appreciated that the configuration of the data center 604 described with reference to FIG. 7 is merely illustrative and that other implementations might be utilized.

Figure 8:
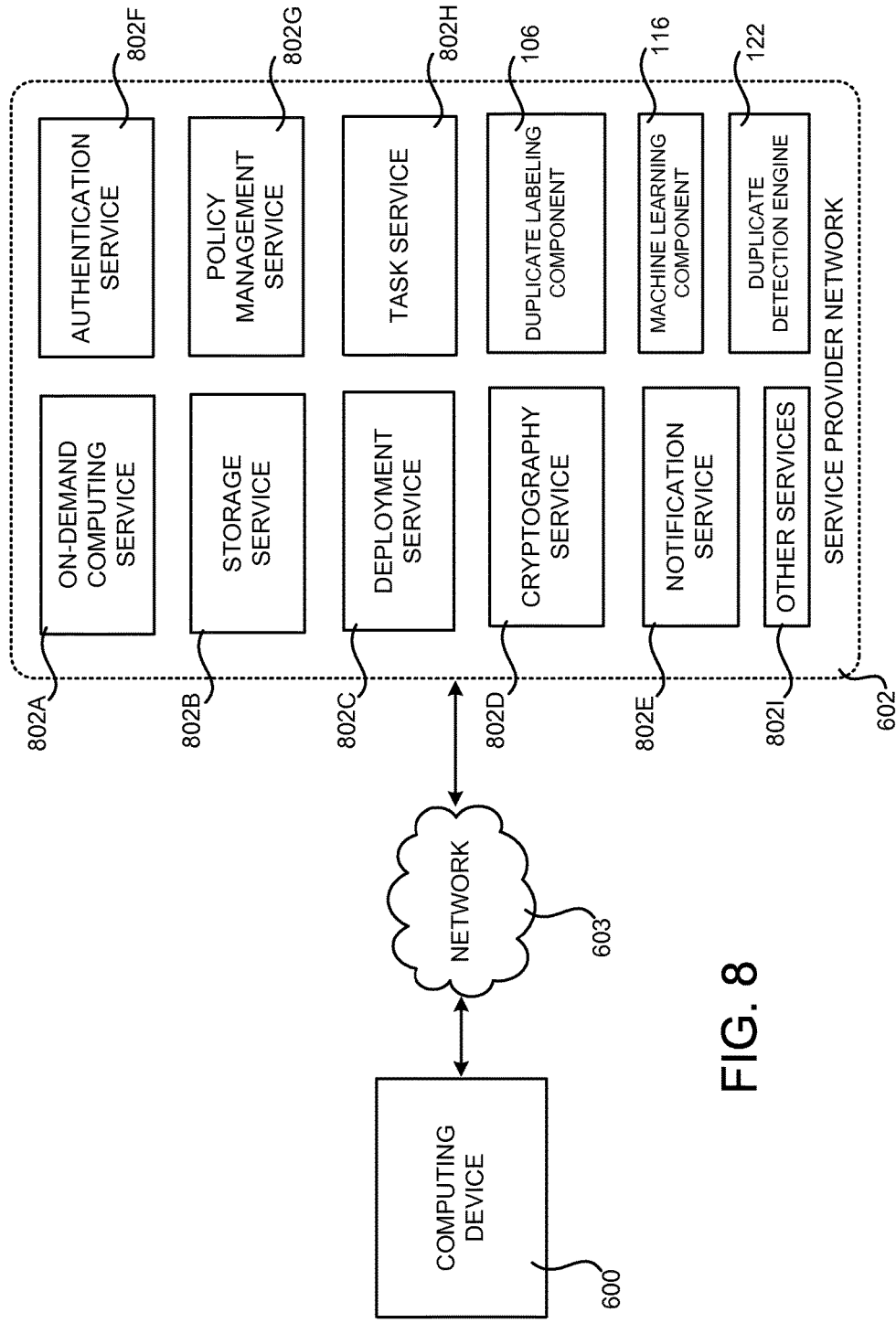
FIG. 8 is a system and network diagram that shows aspects of several services that might be provided by and utilized within a service provider network in one configuration disclosed herein.

FIG. 8 is a system and network diagram that shows aspects of several network services that might be provided by and utilized within a service provider network 602 in one configuration disclosed herein. In particular, and as discussed briefly above, the service provider network 602 may provide a variety of network services to customers and other users of the service provider network 602 including, but not limited to, an on-demand computing service 802A, a storage service 802B, a deployment service 802C, a cryptography service 802D, a notification service 802E, an authentication service 802F, a policy management service 802G, and/or a task service 802H, each of which is described in greater detail below. Additionally, the service provider network 602 might also provide the duplicate labeling component 106, the machine learning component 116 and/or the duplicate detection engine 122 as network services, each of which has been described in detail above. The service provider network 102 might also provide other services 802I, some of which are described in greater detail below.

It should be appreciated that customers of the service provider network 602 may include organizations or individuals that utilize some or all of the services provided by the service provider network 602. As shown in FIG. 8, a customer or other user may communicate with the service provider network 602 through a network 603, which may be a communication network, such as the Internet, an intranet or an Internet service provider ("ISP") network or a combination of such networks. Communications from the computing device 600 to the service provider network 602 may cause the services provided by the service provider network 602 to operate in accordance with the described configurations or variations thereof.

It is noted that not all configurations described include the services described with reference to FIG. 8 and that additional services may be provided in addition to or as an alternative to services explicitly described. Each of the services shown in FIG. 8 might also expose web service interfaces that enable a caller to submit appropriately configured API calls to the various services through web service requests. In addition, each of the services may include service interfaces that enable the services to access each other (e.g., to enable a virtual computer system provided by the on-demand computing service 802 to store data in or retrieve data from the data storage service 802B). Additional details regarding some of the services shown in FIG. 8 will now be provided.

The on-demand computing service 802A may be a collection of computing resources configured to instantiate virtual machine instances. For example, a customer or other user of the service provider network 602 may interact with the on-demand computing service 802A (via appropriately configured and authenticated API calls) to provision and operate virtual computer systems that are instantiated on physical computing devices hosted and operated by the service provider network 602. The virtual computer systems may be used for various purposes, such as to operate as servers supporting a website, to operate business applications or, generally, to serve as computing resources for the customer. Other applications for the virtual computer systems may be to support database applications, electronic commerce applications, business applications and/or other applications. Although the on-demand computing service 802A is shown in FIG. 8, any other computer system or computer system service may be utilized in the service provider network 602, such as a computer system or computer system service that does not employ virtualization and instead provisions computing resources on dedicated or shared computers/servers and/or other physical devices.

In some configurations, the on-demand computing service 802A is configured to provide clusters of computing resources. For example, and without limitation, the on-demand computing service 802A might provide clusters of virtual or physical hosts for executing services such as those described above. According to one configuration, computing clusters provided by the on-demand computing service 802A might be organized as an APACHE™ HADOOP® computing cluster specialized for deployment alongside, or within, the service provider network 602. It should be appreciated that other variations and implementations of computing clusters are possible. Thus, the present disclosure should not be limited to only these examples, but should be interpreted as including any equivalent variations as well.

The computing clusters provided by the on-demand computing service 802A may be utilized to execute software services that benefit from distributed execution on a potentially large number of hosts. For example, and without limitation, some or all of the duplicate labeling component 106, the machine learning component 116, and/or the duplicate detection engine 122 might be executed on computing clusters provided by the on-demand computing service 802A.

The storage service 802B might include software and computing resources that collectively operate to store data using block or file-level storage devices (and/or virtualizations thereof). The storage devices of the storage service 802B might, for instance, be operationally attached to virtual computer systems provided by the on-demand computing service 802A to serve as logical units (e.g., virtual drives) for the computer systems. A storage device might also enable the persistent storage of data used/generated by a corresponding virtual computer system where the virtual computer system service might only provide ephemeral data storage.

The service provider network 602 may also include a cryptography service 802D. The cryptography service 802D may utilize storage services of the service provider network 602, such as the storage service 802B, to store encryption keys in encrypted form, whereby the keys may be usable to decrypt customer keys accessible only to particular devices of the cryptography service 802D. The cryptography service 802D might also provide other types of functionality not specifically mentioned herein.

The service provider network 602 might also provide a notification service 802E in some configurations. The notification service 802E may comprise a collection of computing resources collectively configured to provide a web service or other interface and a browser-based management console. The management console can be used to configure topics for which customers seek to receive notifications, configure applications (or people), subscribe clients to the topics, publish messages, or configure delivery of the messages over clients' protocol of choice (i.e., hypertext transfer protocol ("HTTP"), e-mail and short message service ("SMS"), among others). The notification service 802E might also provide notifications to clients using a "push" mechanism without the need to periodically check or "poll" for new information and updates. The notification service 802E may further be used for various purposes such as monitoring applications executing in the on-demand computing service 802A, workflow systems, time-sensitive information updates, mobile applications, and many others.

As illustrated in FIG. 8, the service provider network 602, in various configurations, also includes an authentication service 802F and a policy management service 802G. The authentication service 802F, in one example, is a computer system (i.e., collection of computing resources) configured to perform operations involved in authentication of users. For instance, one of the services shown in FIG. 8 may provide information from a user to the authentication service 802F to receive information in return that indicates whether or not the requests submitted by the user are authentic.

The policy management service 802G, in one example, is a computer system configured to manage policies on behalf of customers or internal users of the service provider network 602. The policy management service 802G may include an interface that enables customers to submit requests related to the management of policy. Such requests may, for instance, be requests to add, delete, change or otherwise modify policy for a customer, service, or system, or for other administrative actions, such as providing an inventory of existing policies and the like.

The service provider network 602, in various configurations, is also configured with a task service 802H. The task service 802H is configured to receive a task package and to enable executing tasks as dictated by the task package. The task service 802H may be configured to use any resource of the service provider network 602, such as instantiated virtual machines or virtual hosts, for executing the task. The task service 802H may configure the instantiated virtual machines or virtual hosts to operate using a selected operating system and/or a selected execution application in accordance with specified requirements.

The service provider network 602 may additionally maintain other services 802 based, at least in part, on the needs of its customers. For instance, the service provider network 602 may maintain a deployment service 802C for deploying program code and/or a database service (not shown in FIG. 8) in some configurations. A database service may be a collection of computing resources that collectively operate to create, maintain, and allow queries to be performed on databases stored within the service provider network 602. For example, a customer or other user of the service provider network 602 may operate and manage a database from the database service by utilizing appropriately configured network API calls. This, in turn, may allow the customer to maintain and potentially scale the operations in the database. Other services include object-level archival data storage services, and services that manage and/or monitor other services. The service provider network 602 might also be configured with other services not specifically mentioned herein in other configurations.

Figure 9:
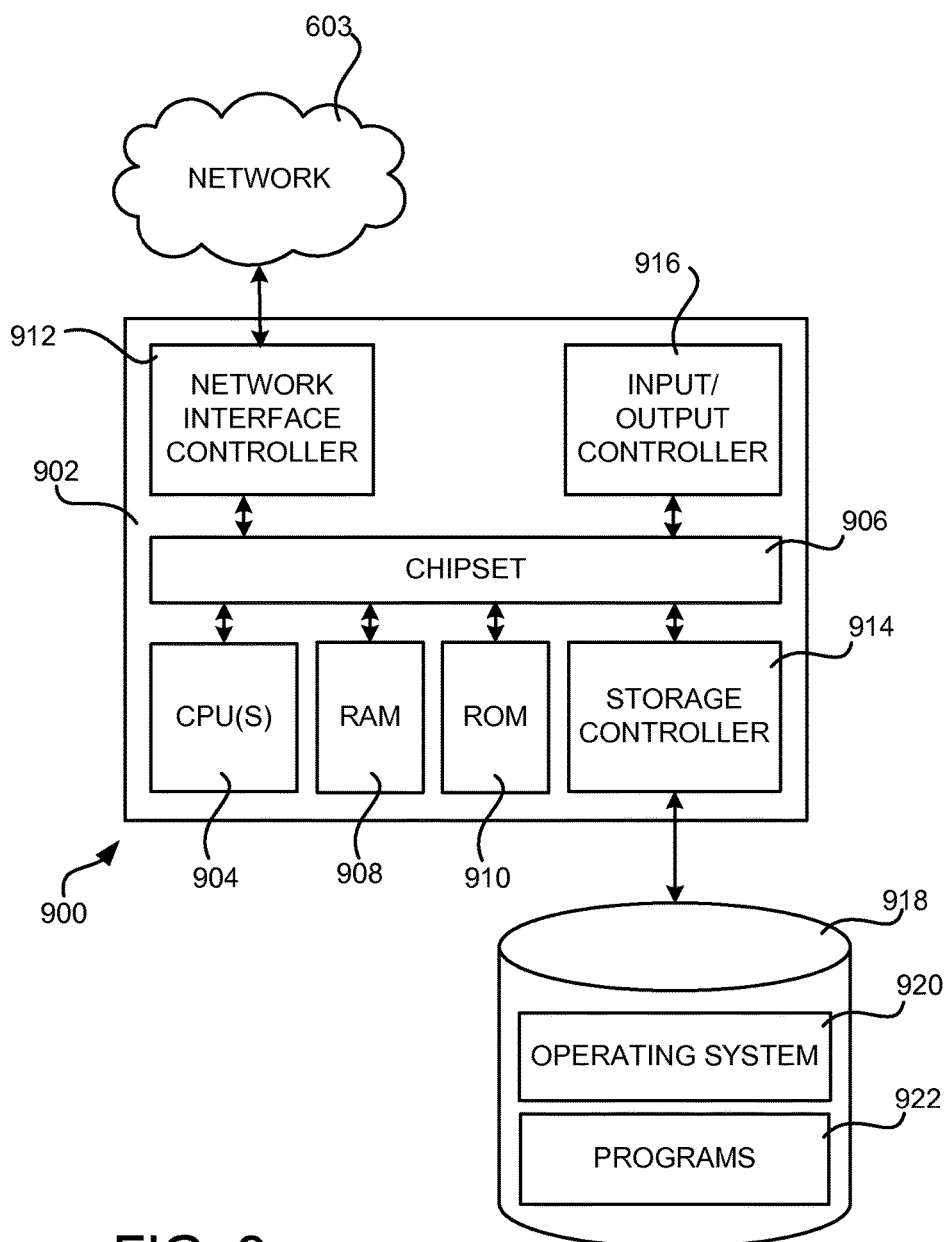
FIG. 9 is a computer architecture diagram showing an illustrative computer hardware architecture for implementing a computing device that might be utilized to implement aspects of the various technologies presented herein.

FIG. 9 shows an example computer architecture for a computer 900 capable of executing program components for implementing various aspects of the functionality described above. The computer architecture shown in FIG. 9 illustrates a conventional server computer, workstation, desktop computer, laptop, tablet, network appliance, e-reader, smartphone, or other computing device, and may be utilized to execute any of the software components presented herein. For example, the computer architecture shown in FIG. 9 may be utilized to execute software components for devel-oping and utilizing machine-learning generated classifiers 118 and/or related functionality.

The computer 900 includes a baseboard 902, or "motherboard," which is a printed circuit board to which a multitude of components or devices may be connected by way of a system bus or other electrical communication paths. In one illustrative configuration, one or more central processing units ("CPUs") 904 operate in conjunction with a chipset 906. The CPUs 904 may be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 may provide an interface to a RAM 908, used as the main memory in the computer 900. The chipset 906 may further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM may also store other software components necessary for the operation of the computer 900 in accordance with the configurations described herein.

The computer 900 may operate in a networked environment using logical connections to remote computing devices and computer systems through a network, such as the network 603. The chipset 906 may include functionality for providing network connectivity through a NIC 912, such as a gigabit Ethernet adapter. The NIC 912 is capable of connecting the computer 900 to other computing devices over the network 603. It should be appreciated that multiple NICs 912 may be present in the computer 900, connecting the computer to other types of networks and remote computer systems.

The computer 900 may be connected to a mass storage device 918 that provides non-volatile storage for the computer. The mass storage device 918 may store an operating system 920, programs 922, and data, which have been described in greater detail herein. The mass storage device 918 may be connected to the computer 900 through a storage controller 914 connected to the chipset 906. The mass storage device 918 may consist of one or more physical storage units. The storage controller 914 may interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 900 may store data on the mass storage device 918 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 918 is characterized as primary or secondary storage, and the like.

For example, the computer 900 may store information to the mass storage device 918 by issuing instructions through the storage controller 914 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 may further read information from the mass storage device 918 by detecting the physical states or characteristics of one or more particular locations within the physical storage units.

In addition to the mass storage device 918 described above, the computer 900 may have access to other computer-readable storage media to store and retrieve information, such as program modules, data structures, or other data. It should be appreciated by those skilled in the art that computer-readable storage media is any available media that provides for the non-transitory storage of data and that may be accessed by the computer 900.

By way of example, and not limitation, computer-readable storage media may include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 918 may store an operating system 920 utilized to control the operation of the computer 900. According to one configuration, the operating system comprises the LINUX operating system. According to another configuration, the operating system comprises the WINDOWS® SERVER operating system from MICROSOFT Corporation. According to further configurations, the operating system may comprise the UNIX operating system or one of its variants. It should be appreciated that other operating systems may also be utilized. The mass storage device 918 may store other system or application programs and data utilized by the computer 900.

In one configuration, the mass storage device 918 or other computer-readable storage media is encoded with computer-executable instructions which, when loaded into the computer 900, transform the computer from a general-purpose computing system into a special-purpose computer capable of implementing the configurations described herein. These computer-executable instructions transform the computer 900 by specifying how the CPUs 904 transition between states, as described above. According to one configuration, the computer 900 has access to computer-readable storage media storing computer-executable instructions which, when executed by the computer 900, perform the various processes described above with regard to FIGS. 1-5. The computer 900 might also include computer-readable storage media for performing any of the other computer-implemented operations described herein.

The computer 900 may also include one or more input/output controllers 916 for receiving and processing input from a number of input devices, such as a keyboard, a mouse, a touchpad, a touch screen, an electronic stylus, or other type of input device. Similarly, an input/output controller 916 may provide output to a display, such as a computer monitor, a flat-panel display, a digital projector, a printer, a plotter, or other type of output device. It will be appreciated that the computer 900 may not include all of the components shown in FIG. 9, may include other components that are not explicitly shown in FIG. 9, or may utilize an architecture completely different than that shown in FIG. 9.

Based on the foregoing, it should be appreciated that technologies for developing and utilizing machine-learning generated classifiers for duplicate document detection have been presented herein. Moreover, although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and media are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example configurations and applications illustrated and described, and without departing from the true spirit and scope of the present invention, which is set forth in the following claims.

What is claimed is:

1. An apparatus for generating a duplicate detection classifier using machine learning, the apparatus comprising:
   a processor; and
   a non-transitory computer-readable storage medium having instructions stored thereupon which are executable by the processor and which, when executed, cause the apparatus to:
   capture duplicate decision data indicating that a first document in a document corpus is a duplicate of a second document in the document corpus;
   store the duplicate decision data;
   determine, based at least in part on the duplicate decision data, that the duplicate detection classifier is to be generated;
   perform machine learning using a first plurality of training documents from the document corpus and the duplicate decision data to generate the duplicate detection classifier;
   identify, using the duplicate detection classifier, at least a duplicate document in a plurality of validation documents from the document corpus;
   determine a precision of the duplicate detection classifier based at least in part on an identification of the duplicate document in the plurality of validation documents;
   determine that the precision of the duplicate detection classifier is below a desired precision; and
   based at last in part on the precision of the duplicate detection classifier being below the desired precision:

add at least the duplicate document to the first plurality of training documents to create a second plurality of training documents; and perform machine learning using the second plurality of training documents to retrain the duplicate detection classifier.

2. The apparatus of claim 1, wherein the non-transitory computer-readable storage medium has further instructions stored thereupon which are executable by the processor and which, when executed, cause the apparatus to identify a portion of the document corpus for which the duplicate detection classifier is to be generated based at least in part on the duplicate decision data.

3. The apparatus of claim 1, wherein the non-transitory computer-readable storage medium has further instructions stored thereupon which are executable by the processor and which, when executed, cause the apparatus to identify a portion of the document corpus for which the duplicate detection classifier is to be generated based at least in part on duplicate documents identified in random samples of the document corpus.

4. The apparatus of claim 1, wherein the non-transitory computer-readable storage medium has further instructions stored thereupon which are executable by the processor and which, when executed, cause the apparatus to identify a portion of the document corpus for which the duplicate detection classifier is to be generated by performing an audit of duplicate documents in the document corpus.

5. The apparatus of claim 1, wherein the non-transitory computer-readable storage medium has further instructions stored thereupon which are executable by the processor and which, when executed, cause the apparatus to:
receive a new document not contained in the document corpus; and
utilize the duplicate detection classifier to identify duplicates of the new document in the document corpus.

6. The apparatus of claim 1, wherein the non-transitory computer-readable storage medium has further instructions stored thereupon which are executable by the processor and which, when executed, cause the apparatus to periodically utilize the duplicate detection classifier to identify duplicate documents in the document corpus.

7. A non-transitory computer-readable storage medium having computer-executable instructions stored thereupon which, when executed by a computer, cause the computer to:
receive data indicating a relationship between a first document in a document corpus and a second document in the document corpus;
determine, based at least in part on the data, that a classifier is to be generated;
based at least in part on determining that the classifier is to be generated, causing machine learning to be performed using a plurality of training documents from the document corpus and the data to generate the classifier, the plurality of training documents including at least the first document and the second document;
analyze a third document using the classifier; and
determine a precision of the classifier based at least in part on analyzing the third document.

8. The non-transitory computer-readable storage medium of claim 7, having further instructions stored thereupon which, when executed by the computer, cause the computer to identify a portion of the document corpus for which the classifier is to be generated based at least in part on the data.

9. The non-transitory computer-readable storage medium of claim 7, wherein the classifier is generated for a portion of the document corpus, and wherein the classifier is generated when a specified number of related documents have been identified in the portion of the document corpus.

10. The non-transitory computer-readable storage medium of claim 7, wherein the classifier is generated when a specified quantity of the data has been received.

11. The non-transitory computer-readable storage medium of claim 7, having further instructions stored thereupon which, when executed by the computer, cause the computer to identify a portion of the document corpus for which the classifier is to be generated based at least in part on relationships between documents identified in random samples of the document corpus.

12. The non-transitory computer-readable storage medium of claim 7, having further instructions stored thereupon which, when executed by the computer, cause the computer to identify a portion of the document corpus for which the classifier is to be generated by performing an audit of documents in the document corpus.

13. The non-transitory computer-readable storage medium of claim 7, having further instructions stored thereupon which, when executed by the computer, cause the computer to:
determine that the precision of the classifier is below a desired precision; and
based at least in part on the precision of the classifier being below the desired precision:
add the third document to the plurality of training documents to create an additional plurality of training documents; and
perform the machine learning using the additional plurality of training documents to retrain the classifier.

14. The non-transitory computer-readable storage medium of claim 7, having further instructions stored thereupon which, when executed by the computer, cause the computer to:
receive a fourth document not contained in the document corpus; and
utilize the classifier to identify documents having a relationship with the fourth document in the document corpus.

15. The non-transitory computer-readable storage medium of claim 7, having further instructions stored thereupon which, when executed by the computer, cause the computer to periodically utilize the classifier to identify related documents in the document corpus.

16. A computer-implemented method for generating a classifier, the method comprising:
receiving data indicating a first relationship between a first document in a document corpus and a second document in the document corpus;
generating the classifier by performing machine learning using training documents from the document corpus and the data;
determining, using the classifier, a second relationship between a third document and at least one of the first document or the second document; and
determining a precision of the classier based at least in part on determining the second relationship between the third document and the at least one of the first document or the second document.

17. The computer-implemented method of claim 16, further comprising:
analyzing the document corpus to identify a portion of the document corpus; and
utilizing the classifier on the portion of the document corpus.

18. The computer-implemented method of claim 17, wherein analyzing the document corpus comprises identifying of a rate at which related documents exist in at least one random sampling of documents in the document corpus.

19. The computer-implemented method of claim 17, wherein analyzing the document corpus comprises performing an audit of duplicate documents or document variations in the document corpus.

20. The computer-implemented method of claim 16, further comprising:
    based at least in part on determining that the third document includes the second relationship with the at least one of the first document or the second document, adding the third document to the training documents to create additional training documents;
    retraining the classifier by performing the machine learning using the additional training documents.

\* \* \* \* \*